(12) United States Patent
Lai

(10) Patent No.: US 7,659,938 B2
(45) Date of Patent: Feb. 9, 2010

(54) NONLINEAR MOVEMENT AND TILT ANGLE CONTROL STRUCTURE OF AN IMAGE CAPTURE DEVICE INSIDE A LIGHT BOX

(75) Inventor: Peng-Cheng Lai, 3F, No. 46, Han-Sheng W. Rd., Panchiao (TW) 220

(73) Assignee: Peng-Cheng Lai, Irvine, CA (US)

( * ) Notice: Subject to any disclaimer, the term of this patent is extended or adjusted under 35 U.S.C. 154(b) by 395 days.

(21) Appl. No.: 11/649,309

(22) Filed: Jan. 4, 2007

(65) Prior Publication Data

US 2007/0171300 A1 Jul. 26, 2007

Related U.S. Application Data

(63) Continuation-in-part of application No. 11/339,448, filed on Jan. 26, 2006, now abandoned.

(51) Int. Cl.
*H04N 5/225* (2006.01)
*G03B 15/00* (2006.01)

(52) U.S. Cl. ............... 348/373; 396/1; 396/2; 396/5; D16/215

(58) Field of Classification Search .......... 348/46, 348/50, 219.1, 373; 396/1–5, 428; D16/205, D16/215, 242
See application file for complete search history.

(56) References Cited

U.S. PATENT DOCUMENTS

| | | | | |
|---|---|---|---|---|
| 3,688,676 A | * | 9/1972 | Cruickshank et al. | 396/428 |
| 4,008,396 A | * | 2/1977 | Loyer | 378/61 |
| 5,457,370 A | * | 10/1995 | Edwards | 318/571 |
| 5,774,214 A | * | 6/1998 | Prettyjohns | 356/344 |
| 5,857,119 A | * | 1/1999 | Borden | 396/5 |
| 6,009,188 A | * | 12/1999 | Cohen et al. | 382/154 |
| D421,446 S | * | 3/2000 | Tringali | D16/215 |
| 6,343,184 B1 | * | 1/2002 | Huebner | 396/3 |
| 6,606,453 B2 | * | 8/2003 | Saigo et al. | 396/1 |
| 6,762,755 B2 | * | 7/2004 | Chen | 345/419 |
| 6,834,960 B2 | * | 12/2004 | Dbjay | 352/243 |
| 6,965,690 B2 | * | 11/2005 | Matsumoto | 382/154 |
| 6,970,202 B1 | * | 11/2005 | Glogan et al. | 348/373 |
| 7,055,976 B2 | * | 6/2006 | Blanford | 362/16 |
| 7,098,435 B2 | * | 8/2006 | Mueller et al. | 250/208.1 |
| 7,253,832 B2 | * | 8/2007 | Iwaki et al. | 348/50 |
| 7,262,783 B2 | * | 8/2007 | Kramer et al. | 345/629 |
| 7,394,977 B2 | * | 7/2008 | Park et al. | 396/5 |
| 2004/0042231 A1 | * | 3/2004 | Lai et al. | 362/539 |
| 2004/0135886 A1 | * | 7/2004 | Baker et al. | 348/143 |
| 2006/0001767 A1 | * | 1/2006 | Lai | 348/373 |
| 2006/0147188 A1 | * | 7/2006 | Weng | 396/5 |

* cited by examiner

*Primary Examiner*—Sinh Tran
*Assistant Examiner*—Richard M Bemben

(57) ABSTRACT

Nonlinear movement and tilt angle control structure of an image capture device inside a light box includes a nonlinear motion set, a rotation set, a cartridge and a compartment. The nonlinear motion set uses dual guiding rails or a single guiding rail to drive the image capture device from top and side directions. The rotation set rotates the image capture device. The cartridge carries the rotation set and is driven by the nonlinear motion set to perform the nonlinear motion. And, the compartment is configured inside the rotation set to ride and fasten the image capture device.

9 Claims, 9 Drawing Sheets

NONLINEAR MOVEMENT AND TILT ANGLE CONTROL STRUCTURE OF AN IMAGE CAPTURE DEVICE INSIDE A LIGHT BOX

REFERENCE TO RELATED APPLICATIONS

This Application is filed as a Continuation-in-Part of patent application Ser. No. 11/339,448, filed 26 Jan. 2006, now abandoned.

BACKGROUND OF THE INVENTION

1. Field of the Invention

The present invention relates to an automatic nonlinear motion and tilt angle control structure of an image capture device.

2. Description of the Prior Art

In general, capturing of image of the objects using an image capture device is generally carried out manually with or without the aid of a tripod stand, which not only takes time but also inaccurate, or under automatic mode. For automation implementation, the image capture device must be moved between the top and the side positions. And, the image capture device must also be rotated for targeting to the object.

In the market, a robotic arm is used to carry and rotate the image capture device. However, because of the length of the robotic swing arm and the heavy load of a rotation set, the image capture device equipped with the robotic arm is not suitable for swinging in the light box. And, the over loaded robotic arm results in a low durability. The present invention adopts a guiding rail to resolve the disadvantages discussed above, which facilitate to move the image capture device along a nonlinear fashion in the light box.

SUMMARY OF THE INVENTION

Other advantages of the present invention will become apparent from the following description taken in conjunction with the accompanying drawings wherein are set forth, by way of illustration and example, certain embodiments of the present invention.

One purpose of the present invention is to provide an image capture device and guiding rails with a curved and a linear shape for carrying the image capture device to facilitate capturing of images of an object disposed on a 3β-turntable from top and side directions inside the limited space of the light box. The 3β-turntable is configured at a bottom of the light box and controlled by a computer to simulate a 3D-image playing file for commercial purpose. Furthermore, if round arc guiding rails are used and then through a detailed mathematical calculation, the captured images can be composed to form a real 3D-image, which is useful in machining process.

To achieve the purposes mentioned above, one embodiment of the present invention is to provide a nonlinear movement and tilt angle control structure of an image capture device inside a light box, which includes: a light box, a nonlinear motion set guided by a dual guiding rail or by a mono guiding rail, a rotation set, a cartridge and a compartment of the image capture device. The nonlinear motion set includes the nonlinear guiding rails, the stepping/servo motors, the main drive pulleys, the idle wheels, the idle pulleys, the timing belts and a cartridge. And, a rotation set includes the compartment of the image capture device, the stepping/servo motor, the timing belt and the idle wheels.

BRIEF DESCRIPTION OF THE DRAWINGS

The foregoing aspects and many of the accompanying advantages of this invention will become more readily appreciated and becomes better understood by reference to the following detailed descriptions, when taken in conjunction with the accompanying drawings, wherein.

DESCRIPTION OF THE PREFERRED EMBODIMENT

Figure 1:
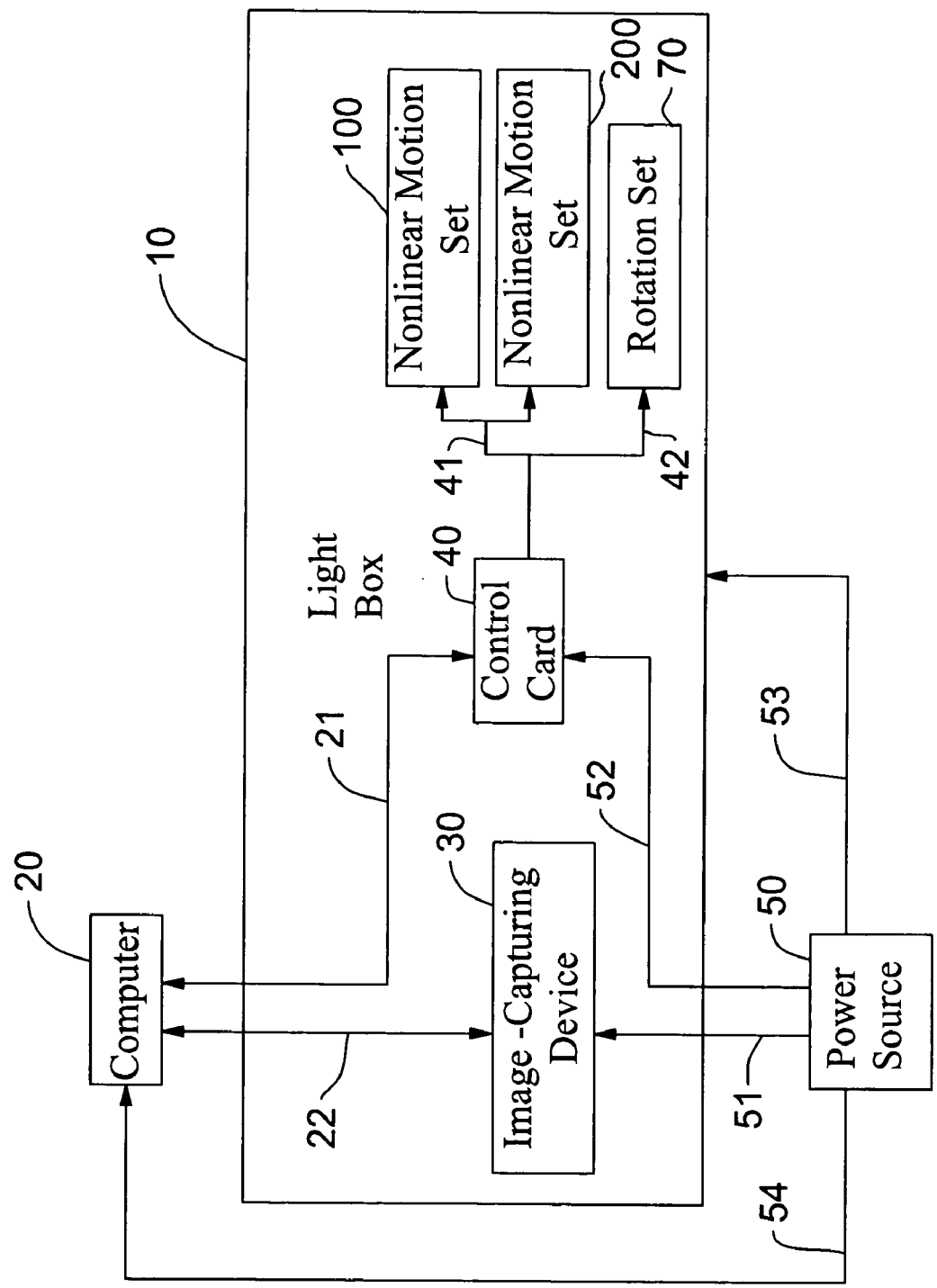
FIG. 1 is a block diagram illustrating a system including an automatic nonlinear movement and tilt angle control structure inside a light box according to one embodiment of the present invention.

FIG. 1 is a block diagram illustrating a system including an automatic nonlinear movement and tilt angle control structure inside the light box according to one embodiment of the present invention. A computer 20 control a control card 40 and an image capture device 30 via USB cables 21 and 22. Meanwhile, a power source 50, via the power cables 51, 52, 53, and 54, provides the power to an image capture device 30, a control card 40, a light box 10 and the computer 20. And, the control card 40 receives the commands from the computer 20 to supply the electrical power and transmit controlling signals to the nonlinear motion sets 100, 200 and a rotation set 70 for accomplishing the nonlinear motion and rotation motion in the light box 10. In addition, the computer 20 can be replaced by a Programmable Logic Controller (PLC) to control the automatic nonlinear motion and tilt angle control structure in the light box 10.

According to the spirit of the present invention, the computer 20 controls the 3D-turntable to rapidly and automatically generate the image files to display the 3D simulated images, for example, in a GIF file format for image communication purpose. Furthermore, for capturing image using a guiding rail with a round arc shape only, a real 3D-image can be composed by mathematical calculation for machining purpose.

Figure 2:
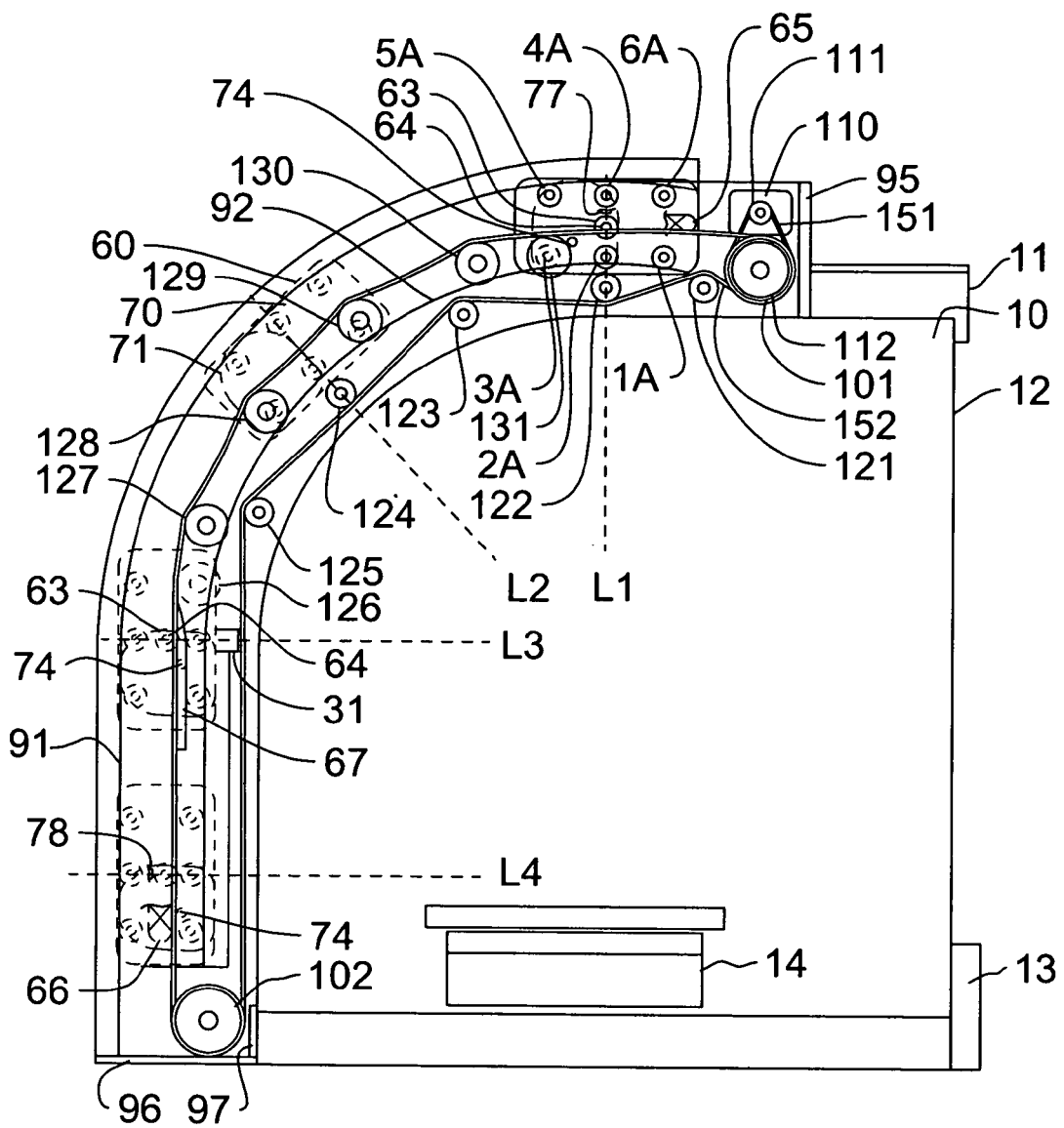
FIG. 2 is a front view of a nonlinear movement and tilt angle control structure of an image capture device inside a light box according to one embodiment of the present invention.
Figure 3:
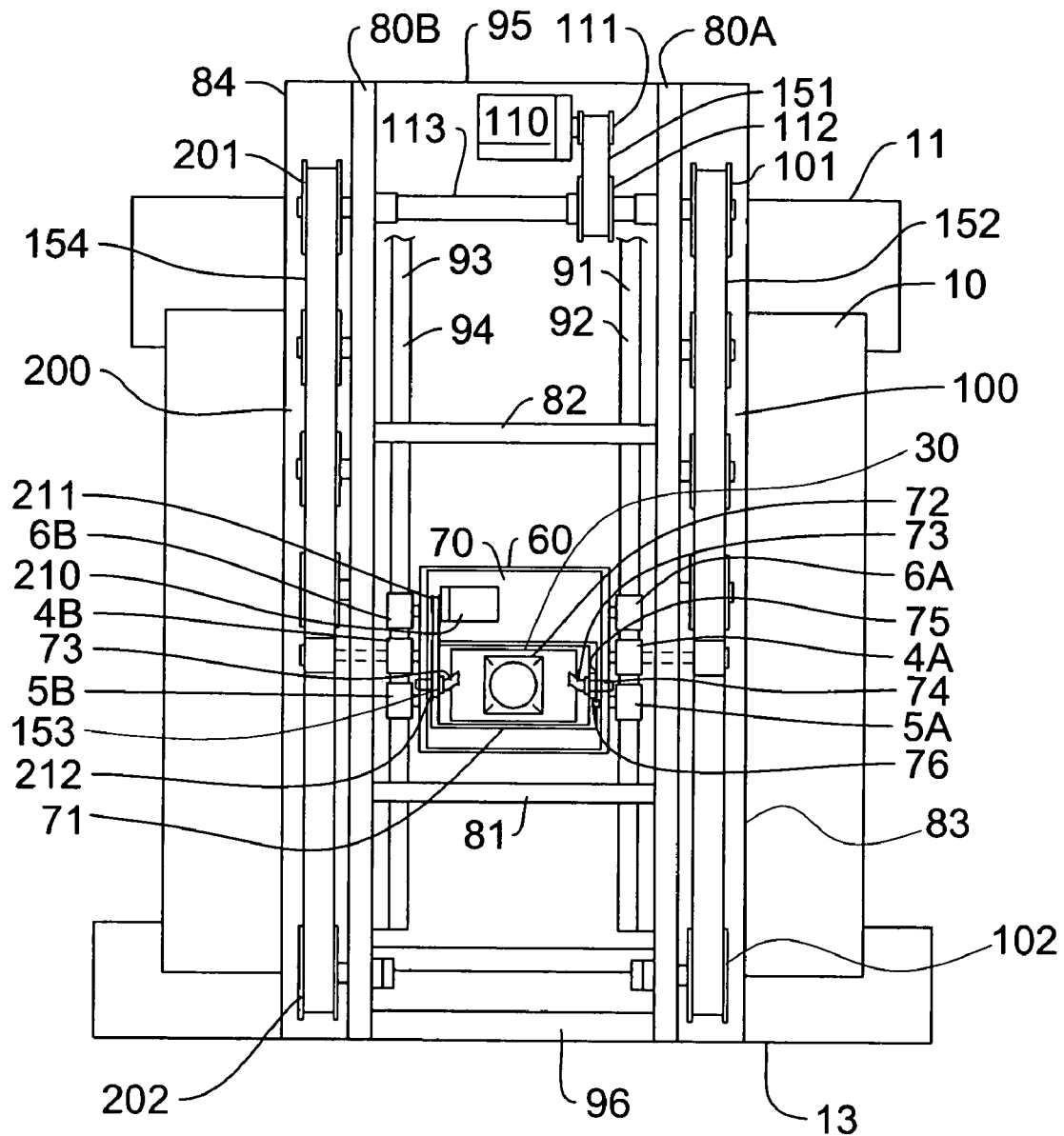
FIG. 3 is a side view of the nonlinear movement and tilt angle control structure of an image capture device inside a light box according to one embodiment of the present invention.

FIG. 2 and FIG. 3 are the front view and side view of a nonlinear movement and tilt angle control structure of an image capture device inside a light box according to one embodiment of the present invention. As illustrated in FIG. 2 and FIG. 3, the nonlinear movement and tilt angle control structure includes a light box 10 (including a top cover 11, a side plate 12, and a base 13), the nonlinear motion sets 100 and 200, a rotation set 70. And a 3D-turntable 14 is configured inside the light box 10. The curved symmetrical dual guiding rails include a right top guiding rail 91, a right bottom guiding rail 92, a left top guiding rail 93 and a left bottom guiding rail 94 which are configured on the main frames 80A and 80B, and the main frames 80A and 80B are enforced by the strengthen elbows 81 and 82. In addition, the two ends of the main frames 80A, 80B are covered and connected by the conjunction plates 95 and 96, and the left/right side of the main frames 80A and 80B are covered by the side plates 83 and 84 and the whole nonlinear motion sets are fixed by the conjunction plate 97 onto the light box 10.

Referring to the FIG. 2 and FIG. 3 again, a cartridge 60 carries a rotation set 70 on the symmetrical nonlinear motion sets 100 and 200 to perform the nonlinear motion which is driven by a motor 110 and transmits the idle wheels 111 and 112 by a belt 151. Then, the idle wheel 112 drives a linkage rod 113 to transmit the main drive pulleys 101 and 201 and all of the idle wheels (only shown from the right side of the idle wheels 121 to 131 on the FIG. 2) by the belts 152, 154 and idle pulleys 102 and 202. Therefore, the image capture device 30 can be moved from top to side relative to an object placed inside the light box, wherein the motor 110 can be a stepping motor or a servo motor.

Referring to FIG. 2 and FIG. 3 again, the main drive pulley 101 is activated, and the idle pulley 102 is driven by the belt 152 through the idle wheels 121, 122, 123, 124, 125. Then, the belt 152 is transmitted back to the main drive pulleys 101 thorough the idle wheels 126, 127, 128, 129, 130 and 131 to form the torque transmission structure as a close loop.

According to the spirits of the present invention, the idle pulley 121 is an adjustable idle wheel to adjust the tension of the belt. The belt 152 is fixed with a screw (not shown) on a collar 63 of the cartridge 60, and the collar 63 clips a dragging rod 64. Therefore, when the main drive pulley 101 is activated, the cartridge 60 is dragged to perform a nonlinear motion among the right top guiding rail 91, the right bottom guiding rail 92, the left top guiding rail 93 and the left bottom guiding rail 94. In addition, the dual guiding rails may be configured into a shape of a round arc, or a parabola, or a combination of round arc and parabola, or a combination of the round arc, parabola and straight line. Moreover, the belt 152 may be replaced by cables or ropes to drive the image capture device 30 by operating the motor 110.

Figure 4:
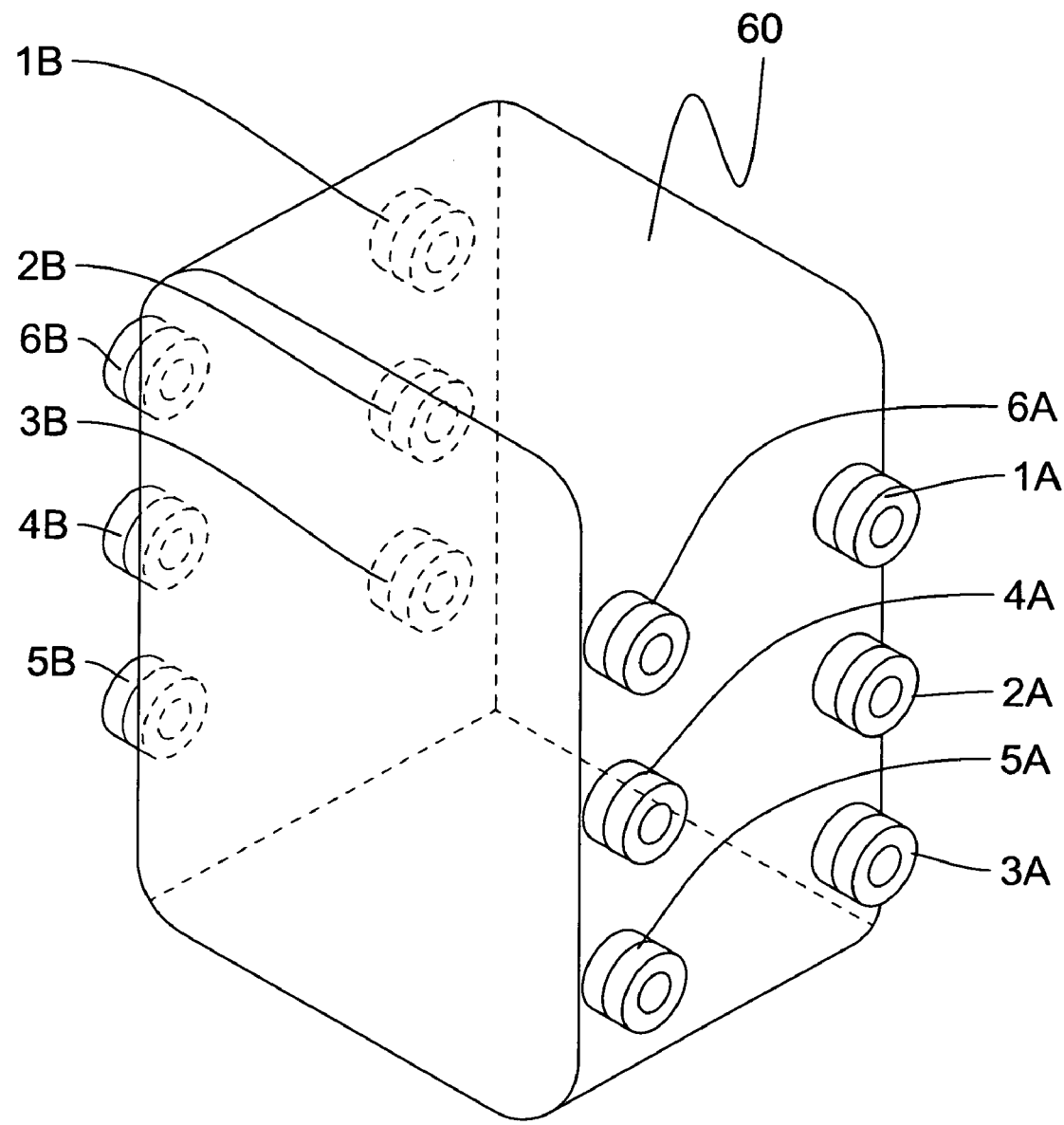
FIG. 4 is a perspective diagram illustrating a cartridge and rollers thereon according to one embodiment of the present invention.

FIG. 4 is a perspective diagram illustrating a cartridge and the rollers thereon according to one embodiment of the present invention. The rollers 1A, 2A, 3A, 4A, 5A and 6A and the rollers 1B, 2B, 3B, 4B, 5B and 6B are configured at two sides of cartridge 60 separately. Next, referring to the FIG. 2, FIG. 3 and FIG. 4, the rollers 1A, 2A, 3A, 4A, 5A and 6A, and the rollers 1B, 2B, 3B, 4B, 5B and 6B have the V shape or Λ shape contact with the right top guiding rail 91, the right bottom guiding rail 92, the left top guiding rail 93 and the left bottom guiding rail 94 separately. When the cartridge 60 is at the curved position L1 and L2, the rollers 2A, 5A and 6A contact with the right top guiding rail 91 and the right bottom guiding rail 92. Meanwhile, the rollers 2B, 5B, 6B contact with the left top guiding rail 93 and the left bottom guiding rail 94. Next, when the cartridge 60 moves from the curved section to the straight section of the guiding rail (the cartridge 60 is at position L3 and L4), a guiding plate 67 guides the rollers into 1A, 2A, 3A and 4A and rollers 1B, 2B, 3B and 4B gradually, which have the V shape or Λ shape to contact with the right top guiding rail 91, the right bottom guiding rail 92, the left top guiding rail 93 and the left bottom guiding rail 94 respectively. Additional, the escape guiding slots 65 and 66 penetrate the right top guiding rail 91, the right bottom guiding rail 92, the left top guiding rail 93 and the left bottom guiding rail 94 to extend the collar 63 and the dragging rod 64 and to connect with the belt 152. Therefore, the cartridge 60 can nonlinearly along the L1, L2, L3 and L4 positions. When the cartridge 60 moves along round arc and linear sections between the right top guiding rail 91, the right bottom guiding rail 92, the left top guiding rail 93 and the left bottom guiding rail 94 until the cartridge 60 moves to the limited position, the optical sensors 77 and 78 detect and stops the motor 110.

Next, when the rotation set 70 is activated, the motor 210 inside the cartridge 60 drives the idle wheels 211 and transmits the idle wheel 212 via a belt 153, and then a compartment 71 is driven to rotate the image capture device 30. Furthermore, the compartment 71 comprises a pad 72 for mounting the image capture device 30 thereon, and the compartment 71 has a through hole (not shown) to allow a lens 31 being extended out from the through hole. On the other hand, the image capture device 30 is fixed by a fastener Velcro® 73, which is a kind of fastening strip, and the compartment 71 can be simplified as a rotatable bottom-plate (not shown) of the cartridge 60. One head, a rotation shift 74 of the compartment 71 controls the rotating angle by a optical sensor 76, which detects the holes (not shown) of a lighting block disk 75 to control the tilt angle thereby.

Figure 5:
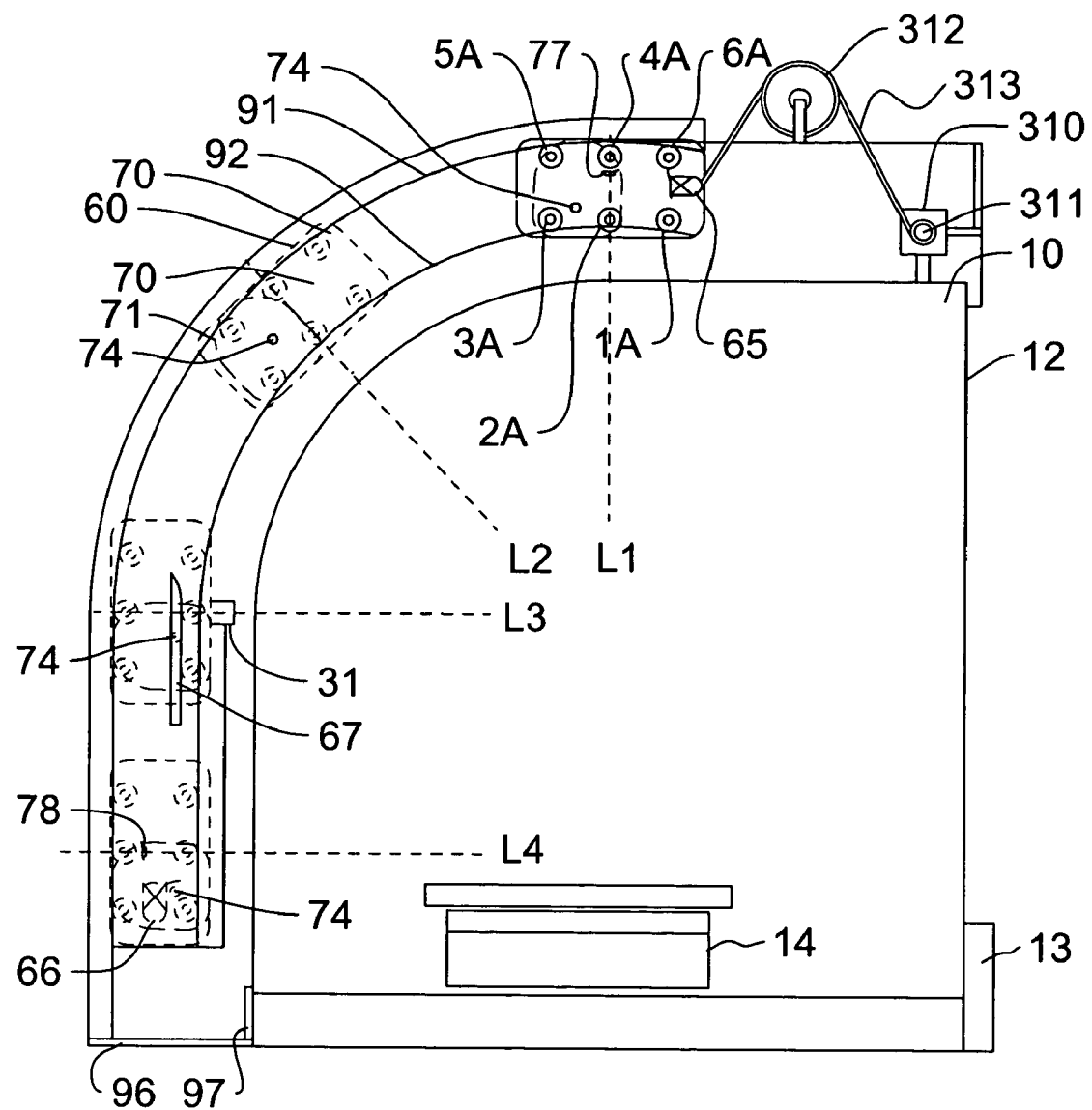
FIG. 5 is a front view of a nonlinear movement and tilt angle control structure of an image capture device inside a light box according to another embodiment of the present invention.
Figure 6:
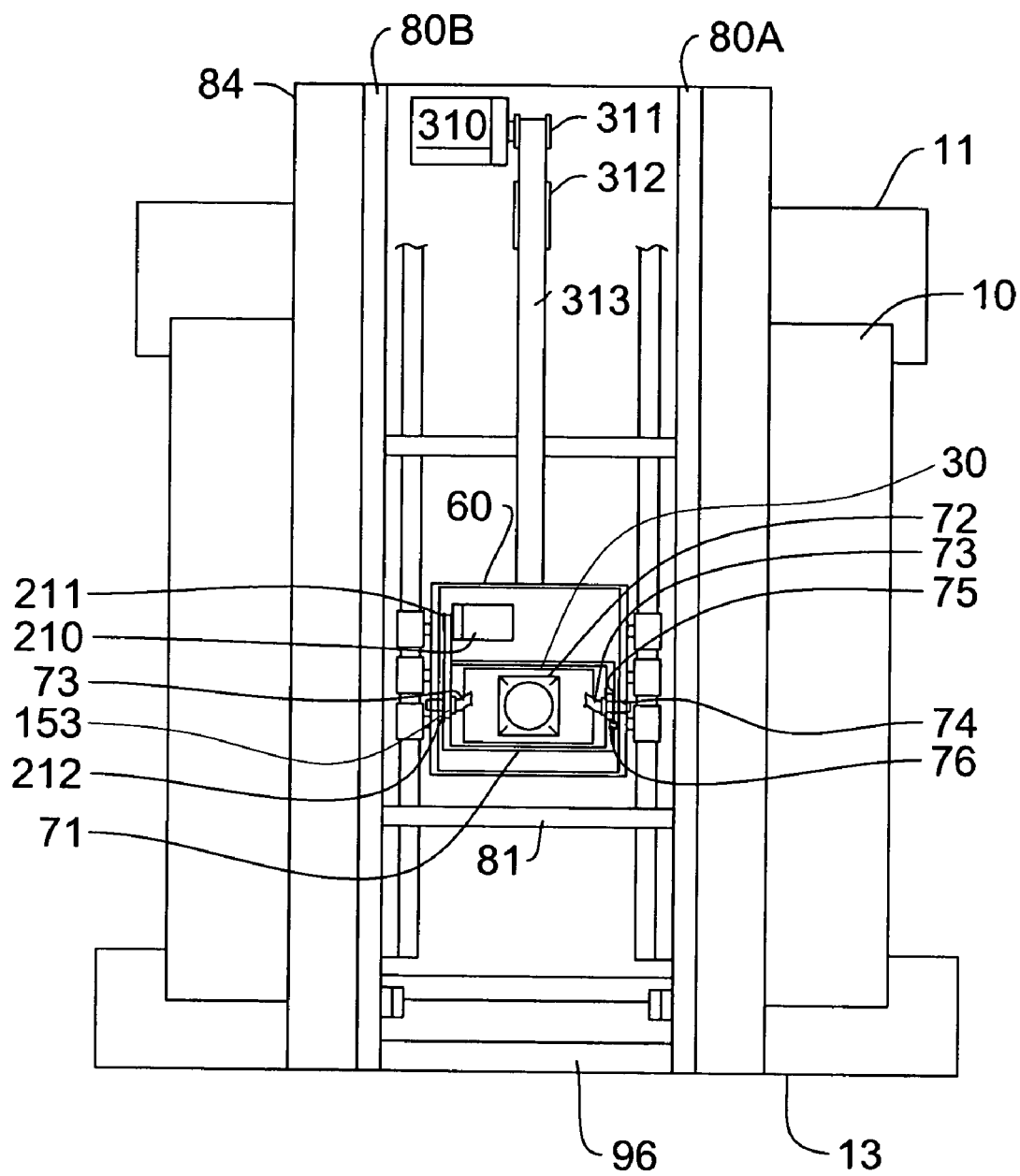
FIG. 6 is a side view of the nonlinear movement and tilt angle control structure of an image capture device inside a light box according to another embodiment of the present invention.

FIG. 5 and FIG. 6 illustrate the front view and side of a nonlinear movement and tilt angle control structure of an image capture device inside the light box according to another embodiment of the present invention. The present embodiment illustrated in FIG. 5 and FIG. 6 are similar to the embodiment described with reference to FIG. 2 and FIG. 3, except for the two sides of the nonlinear motion sets 100 and 200 are eliminated. Next, referring to FIG. 4, FIG. 5, and FIG. 6, the two sides of the cartridge 60 have the rollers 1A, 2A, 3A, 4A, 5A and 6A and the rollers 1B, 2B, 3B, 4B, 5B and 6B in contact with the right top guiding rail 91, the right bottom guiding rail 92, the left top guiding rail 93 and the left bottom guiding rail 94 dragged downward by the gravity force. And, the motor 310 drives the drive pulley 311 and idle pulley 312 winding the steel wire 313 at the drive pulley 311 thereby.

Figure 7:
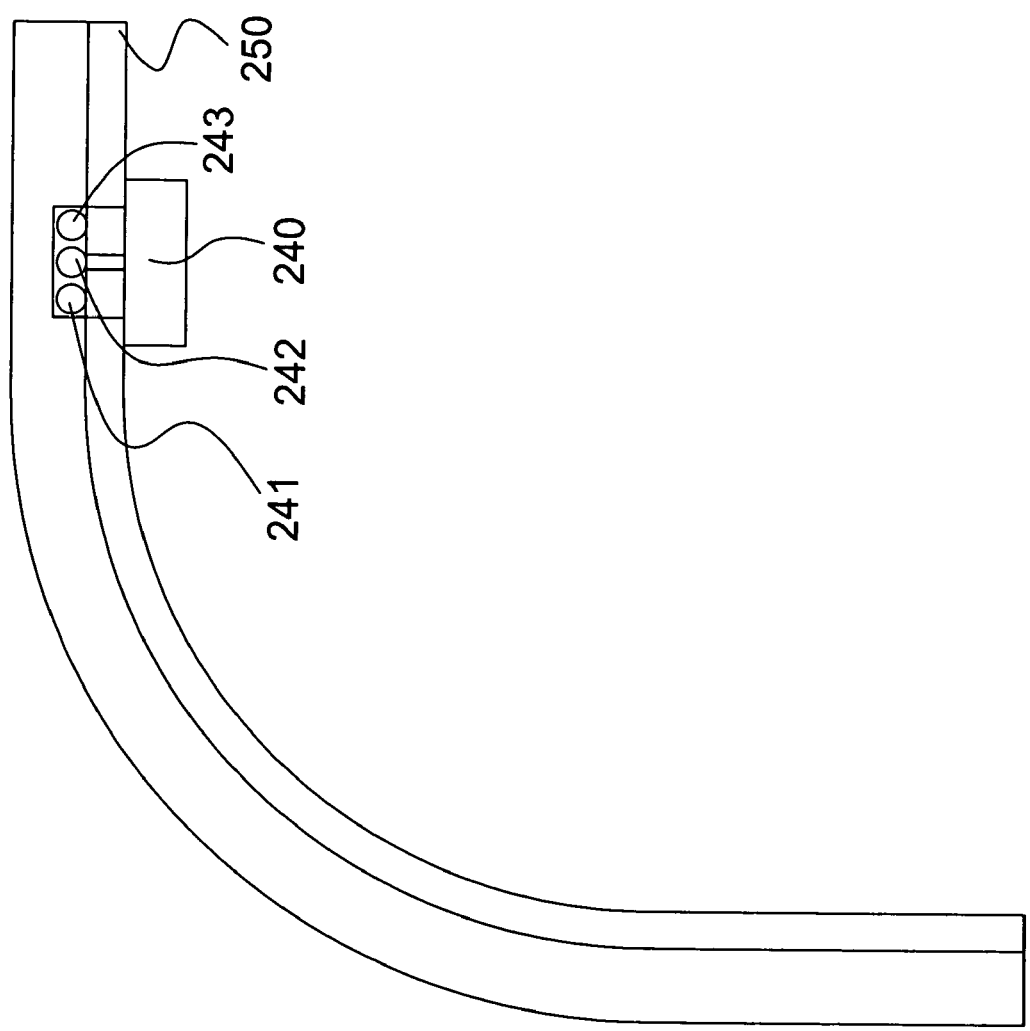
FIG. 7 is a front view of a nonlinear movement and tilt angle control structure of an image capture device inside a light box according to yet another embodiment of the present invention.
Figure 8:
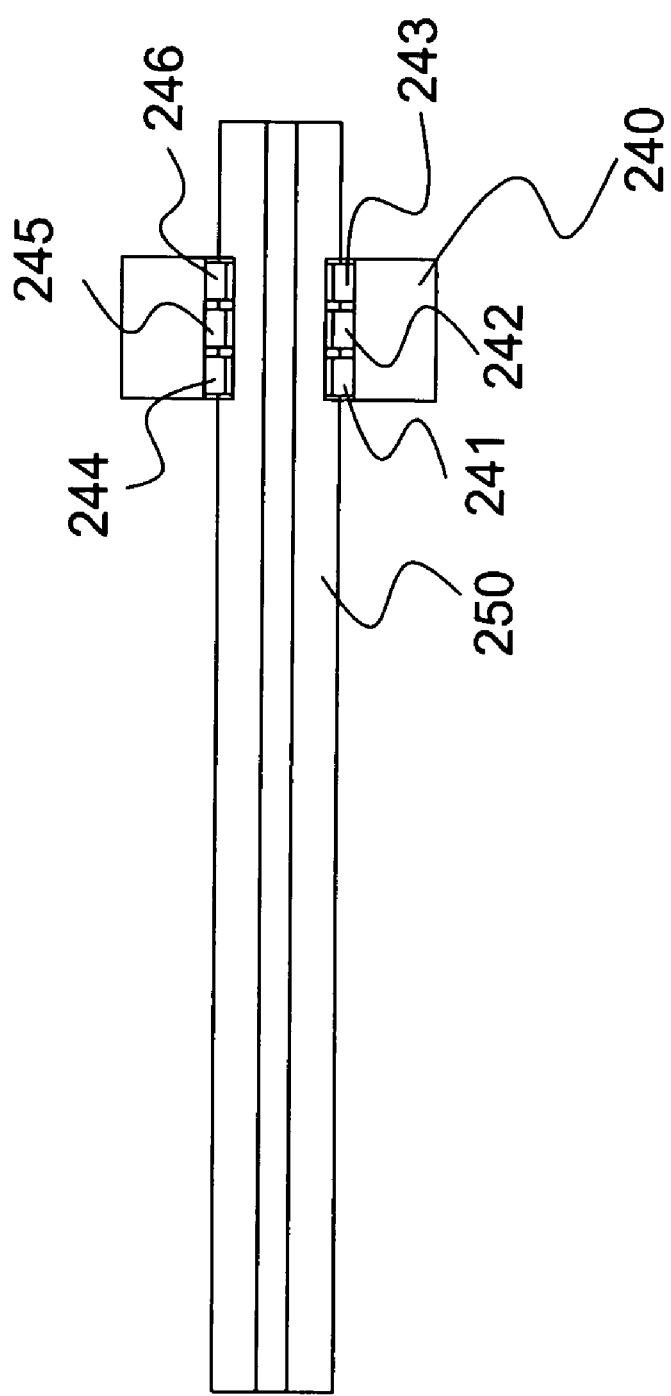
FIG. 8 is a side view of the nonlinear movement and tilt angle control structure of an image capture device inside a light box according to yet another embodiment of the present invention.

Accordingly, the nonlinear guiding rail could be either the dual nonlinear or the mono guiding rail shown in FIG. 7 and FIG. 8. As shown in FIG. 7 and FIG. 8, a cartridge 240 is hanged under the nonlinear mono guiding rail 250 with T shape, and the two sides of the cartridge 240 have the rollers 241, 242, 243, 244, 245 and 246 configured on the mono guiding rail 250. Meanwhile, according to the spirit of the present invention, the rollers or sliding blocks can be a single or plural arranged in a row to allow the cartridge perform the nonlinear motion.

Figure 9:
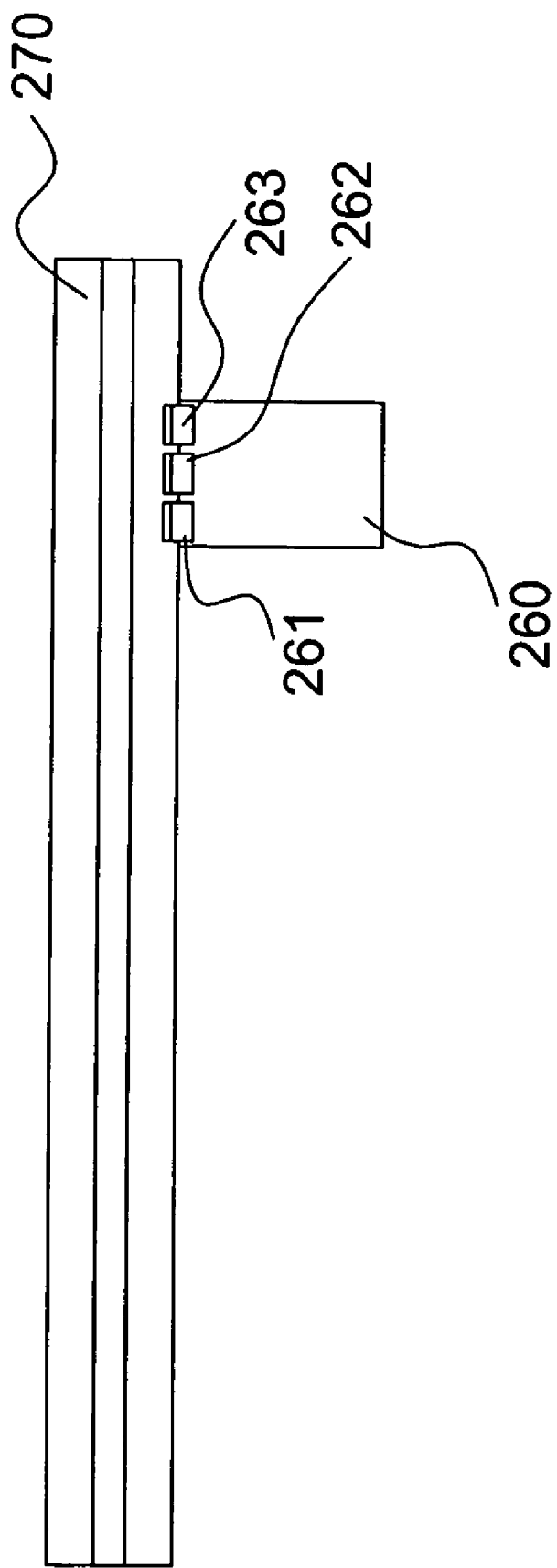
FIG. 9 is a side view of a nonlinear movement and tilt angle control structure of an image capture device inside a light box according to the present invention.

FIG. 9 is a side view of a nonlinear movement and tilt angle control structure of an image capture device inside the light box according to the present invention. The present invention is similar to the embodiment described with reference to FIG. 3, except for only a single side of the mono guiding rail 270 is adopted. One side of a cartridge 260 is configured the rollers 261, 262 and 263 to set on the mono guiding rail 270 for performing the nonlinear motion that is driven by the belt (not shown), wherein the rollers 261, 262 and 263 are arranged in a triangle shape. If the rollers are arranged in a straight line, one row of the rollers is needed to be set on the same side of the cartridge 260 at upper and lower positions to contact with the top/bottom side of the mono guiding rail 270 separately.

In summary, the present invention has proposed a structure to control nonlinear motion and tilt angle of the image capturing device, and particularly the symmetrical dual guiding rails structure, which can balance the image capturing device and the cartridge. Although, it is difficult to design the nonlinear motion of the image capturing device, but the nonlinear guiding rails can carry a heavier image capture device, cartridge, and compartment. Moreover, only one motor is needed, which can nonlinearly move the image capturing device from top and side directions. Thus, applying the core technology of the automatic nonlinear motion and tilt angle control structure can benefit the general users and popularize the photography automation in different areas.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A nonlinear motion and tilt angle control structure for an image capture device inside a light box, comprising:
    a nonlinear motion set comprising curved dual guiding rails respectively and symmetrically arranged on a right main frame and a left main frame, which are covered and connected by conjunction plates to be fixed onto the light box;
    a rotation set comprising a compartment for holding an image capture device;
    a cartridge disposed between said dual guiding rails and configured for moving on the curved dual guiding rails and to carry the rotation set, and being driven by the nonlinear motion set, wherein the cartridge is equipped with a plurality of right top rollers, a plurality of right bottom rollers, a plurality of left top rollers and a plurality of left bottom rollers, and the top right rollers, top left rollers, the right bottom rollers and the left bottom rollers are respectively constrained in a top right rail, a top left rail, a bottom right rail and a bottom left rail of the curved dual guiding rails, and wherein the compartment is driven by a motor inside the cartridge by using a rotation belt and rotation idle wheels to control rotation angles of said image capture device; and
    a right belt configured on a right drive pulley, a right idle pulley and plurality of right idle wheels; and a left belt configured on a left drive pulley, a left idle pulley and a plurality of left idle wheels;
    wherein the right and left drive pulleys are driven by the motor, wherein the cartridge is screwed on the right belt and the left belt so that the image capture device moves along the dual guiding rails and captures an object on a 3D-turntable inside the light box from a top to a side of said object when said right and left belts are driven by said motor.

2. The nonlinear motion and tilt angle control structure for an image capture device inside a light box according to the claim 1, wherein the curved dual guiding rails are in round arc, or parabolic, or a combination of the round arc and the parabolic, or a combination of the round arc, the parabolic and a straight line shape.

3. The nonlinear motion and tilt angle control structure for an image capture device inside a light box according to the claim 1, wherein the right belt and the left belt comprise cables or ropes.

4. The nonlinear motion and tilt angle control structure for an image capture device inside a light box according to the claim 1, wherein the compartment is configured with a pad and a fastening strip.

5. The nonlinear motion and tilt angle control structure for an image capture device inside a light box according to the claim 1, wherein the compartment is a rotatable bottom plate of the cartridge.

6. The nonlinear motion and tilt angle control structure for an image capture device inside a light box according to the claim 1, wherein the shape of the rollers of the cartridge comprise a V shape or a Λ shape.

7. The nonlinear motion and tilt angle control structure for an image capture device inside a light box according to the claim 1, wherein a position of said right idle pulley and said left idle pulley are adjustable respectively to adjust a tension of the right belt and the left belt.

8. The nonlinear motion and tilt angle control structure for an image capture device inside a light box according to the claim 1, wherein said cartridge comprises optical sensors to detect a position of the cartridge movement.

9. The nonlinear motion and tilt angle control structure for an image capture device inside a light box according to the claim 1, wherein said rotation set comprises optical sensors to detect holes of a lighting block disk of said cartridge to control a tilt angle of said image capture device.

* * * * *